(12) United States Patent
Chuah et al.

(10) Patent No.: US 7,618,055 B2
(45) Date of Patent: Nov. 17, 2009

(54) STROLLER CHANGING STATION

(76) Inventors: Khai Gan Kenneth Chuah, 4601 Steed Dr., Austin, TX (US) 78749; Fong Yong Jane Khor, 4601 Steed Dr., Austin, TX (US) 78749

( * ) Notice: Subject to any disclaimer, the term of this patent is extended or adjusted under 35 U.S.C. 154(b) by 355 days.

(21) Appl. No.: 11/533,367

(22) Filed: Sep. 20, 2006

(65) Prior Publication Data

US 2007/0170674 A1 Jul. 26, 2007

Related U.S. Application Data

(60) Provisional application No. 60/766,501, filed on Jan. 24, 2006, provisional application No. 60/767,214, filed on Mar. 12, 2006, provisional application No. 60/803,513, filed on May 31, 2006.

(51) Int. Cl.
*B62B 3/02* (2006.01)
(52) U.S. Cl. .................. 280/642; 280/47.41; 296/97.21
(58) Field of Classification Search ................. 280/642, 280/641, 639, 9, 20, 32.6, 47.25, 47.24, 47.17, 280/47.34, 47.38, 47.39, 47.41; 296/97.21, 296/107.02
See application file for complete search history.

(56) References Cited

U.S. PATENT DOCUMENTS

| | | | |
|---|---|---|---|
| 3,334,909 A | 8/1967 | Smith et al. | |
| 3,730,407 A | 5/1973 | Russell | |
| 5,234,224 A | 8/1993 | Kim | |
| 5,375,869 A | * 12/1994 | Hsiao | ......................... 280/648 |
| 6,389,624 B1 | 5/2002 | Madole | |
| 7,347,442 B1 | 3/2008 | Carter | |
| 7,431,395 B2 | * 10/2008 | Morgan et al. | ......... 297/219.12 |

\* cited by examiner

*Primary Examiner*—Paul N Dickson
*Assistant Examiner*—John D Walters
(74) *Attorney, Agent, or Firm*—Mark G. Pannell; Hanes & Schutz, LLC

(57) ABSTRACT

The present invention relates to a diaper changing station in connection with a stroller. The diaper changing station is attached to the stroller. When stored, the changing station does not detract from the appearance of the stroller. The changing station may be opened for use. The changing station is formed of a waterproof material for easy cleanup. In one embodiment, the changing station includes a bed and frame which are folded and stored below the seat of the stroller. The frame extends the bed from between the legs of the stroller to create a surface for the changing station. In other embodiments, the seat of the stroller is formed of multiple parts which are convertible from an upholstered seat to a changing station.

15 Claims, 5 Drawing Sheets

STROLLER CHANGING STATION

CROSS-REFERENCE TO RELATED APPLICATIONS

This application claims priority to U.S. Provisional Application Ser. Nos. 60/766,501, 60/767,214 and 60/803,513, filed Jan. 24, 2006, Mar. 12, 2006, and May 31, 2006, respectively.

BACKGROUND OF THE INVENTION

1. Field of the Invention

The present invention relates to baby strollers. More particularly, it related to a baby stroller which is convertible to a diaper changing station.

2. Discussion of Related Art

The concept of "making life easy" for new parents has perpetuated many devices and tools existing today. Equipment that was invented years ago continues to evolve as new technology and ideology encourage improvement for better usability. One of the equipment which is regularly changing is the baby stroller. The baby stroller has a recorded history of more than 270 years, being first built by an English garden architect. As the stroller evolved, many featured were added, primarily to reduce weight and size to improve mobility and portability. Other improvements have included compartments and bags for carrying supplies. Other strollers have been designed to allow converstion to a car seat or bed. Despite these many modifications and improvements, strollers still can be modified to simplify life for the users.

Changing dirty diapers on a baby can be difficult when away from home. As with strollers, there have been many improvements over the years. Many diaper bags include a changing pad. This is merely a vinyl pad that is placed on surface. Often, use of the pad involves placing it on the dirty ground, which has been trotted by people and animals on a daily basis. Today, there are also changing stations available in public places, such as public restrooms. These provide a cleaner environment for changing diapers. However, changing a baby then involves a trip to the restroom, which may not be accessible and do not always have a changing station. Various portable changing stations are known. However, these are often awkwardly shaped and complex to be assembled. Furthermore, they take up valuable space and weight necessary for all of a baby's needs. Therefore, a need exists for a changing station which is readily available and easily used.

SUMMARY OF THE INVENTION

The present invention improves the accessibility of changing stations by providing one in connection with a stroller. Therefore, whenever the stroller is available, the user has a clean changing area which is easily assembled, used, stored and carried. According to one aspect of the invention, the changing station includes a foldable structure which is disposed below the seat of the stroller. The structure can be extended from the stroller to the ground to provide an angled or level changing area. According to one aspect of the invention, the changing station includes legs for supporting it above the ground. According to another aspect of the invention, the changing station includes a hinged frame which can be folded to fit in a space on the stroller. According to another aspect of the invention, the changing station is easily assembled and disassembled. According to another aspect of the invention, the changing station is easily stored. According to another aspect of the invention, the changing station is foldable in multiple directions to fit different types of folding strollers. According to another aspect of the invention, the changing station is attachable and detachable from the stroller.

According to another aspect of the invention, the changing station is formed as part of the seat of the stroller. The stroller seat can be opened to form the changing station. According to another aspect of the invention, a portion of the stroller seat can be extended to form the changing station. According to another aspect of the invention, a sheet of waterproof material can be extended over the upper surface of the stroller seat.

DETAILED DESCRIPTION

Figure 1:
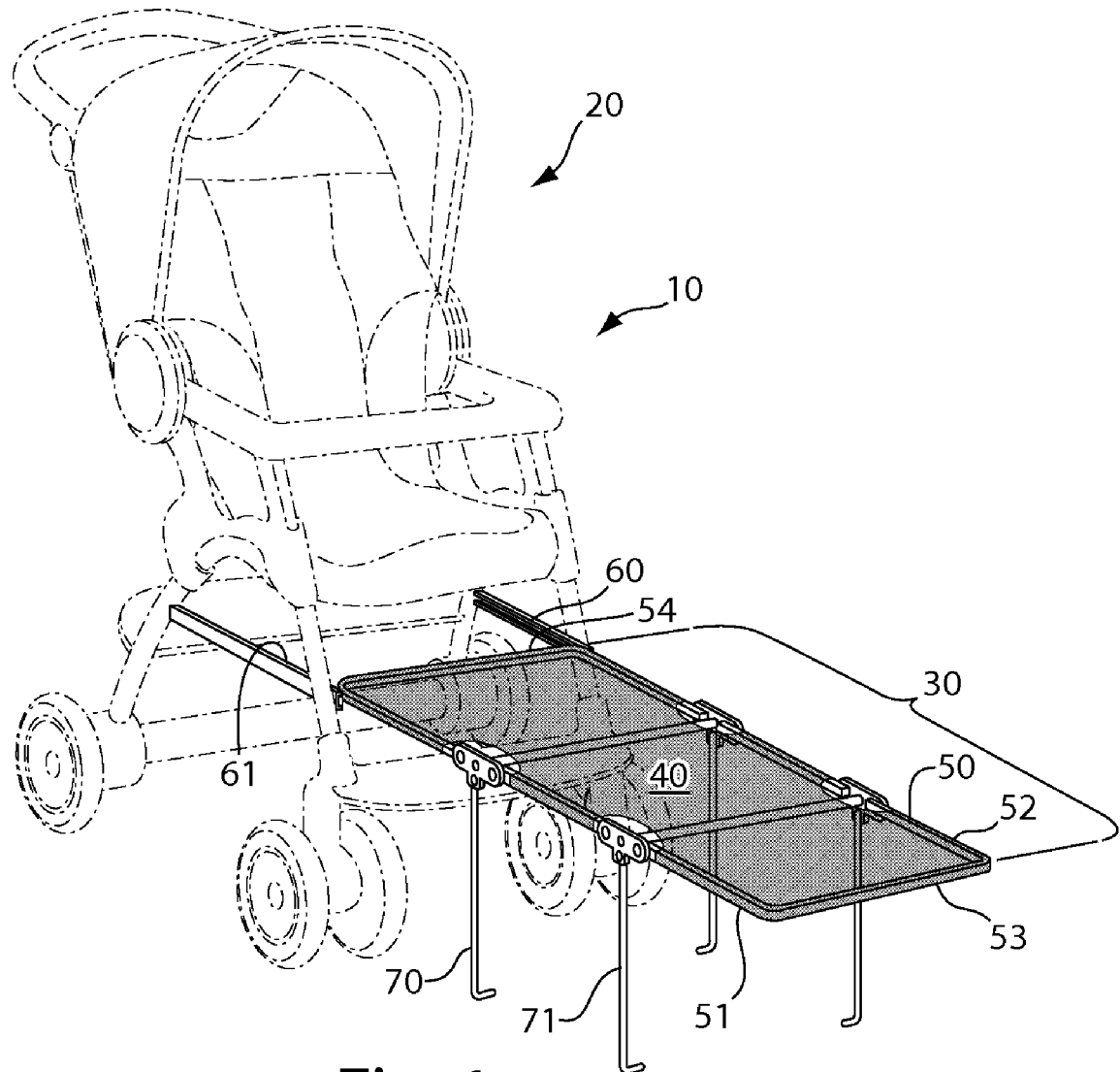
FIG. 1 is a perspective view of stroller with a changing station in an extended position according to an embodiment of the present invention.

FIG. 1 illustrates a first embodiment of a changing station stroller 10 according to the present invention. The changing station stroller 10 includes an ordinary stroller 20. The stroller 20 may be of any known type or design. A changing station 30 is connected to and extends from the front of the stroller 20. The changing station 30 includes a bed 40 and a frame 50. The bed 40 is of a durable material. Preferably, the material is waterproof and flexible. The material must be sufficiently strong to support the weight of a baby or toddler. The material can be entirely flexible so that it is supported by the frame. Alternatively, it may be sufficiently stiff to support a child, yet be foldable with the frame.

Figure 3A:
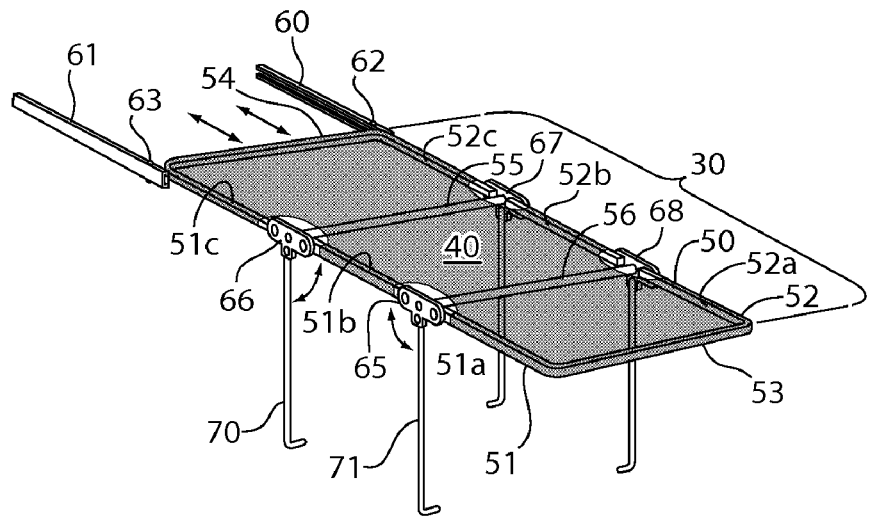
FIG. 3a is a perspective view of a changing station according to an embodiment of the present invention.

According to an embodiment of the invention, the frame 50 is formed of lightweight, rust-free rods, arranged to form borders for the bed 40. The structure of changing station 30 and the frame 50 is illustrated in FIG. 3a. The frame 50 includes two side rods 51, 52 and two end rods 53, 54. The side rods 51, 52, and end rods 53, 54 are connected together to form a rectangle. The bed 40 is connected to the rods of the frame 50 to form the changing station. As illustrated in FIG. 3a, the side rods 51, 52 are formed each formed of three pieces 51a, 51b, 51c, 52a, 52b, 52c. Hinges 65, 66, 67, 68 connect adjacent pieces of the side rods 51, 52. The use of rod pieces and hinges allows the changing station to be easily folded for storage under the seat of the stroller 20. The hinges 65, 66, 67, 68 may be of a type which lock into various positions. A locking hinges prevent the frame 50 from inadvertently folding or unfolding. Of course, the present invention is not limited to three sections for the side rods. A single side rod could be used. More or fewer pieces can be used for the side rods. Cross rods 55, 56 may be positioned in the frame 50 between the hinges on opposite sides of the frame. Cross rods 55, 56 provide additional support for the bed 40 and for the child.

The frame 50 further includes legs 70, 71 positioned at the hinges 65, 66. The legs on the other side of the frame are not visible. Depending upon the design of the hinges 65, 66, the legs 70, 71 can be connected to the same structure. Alternatively, additional hinges can be used to connect the legs 70, 71 to the frame 50. The legs 70, 71 extend from the frame to the ground when the changing station 30 is in the opened position, as illustrated in FIG. 1.

Figure 3B:
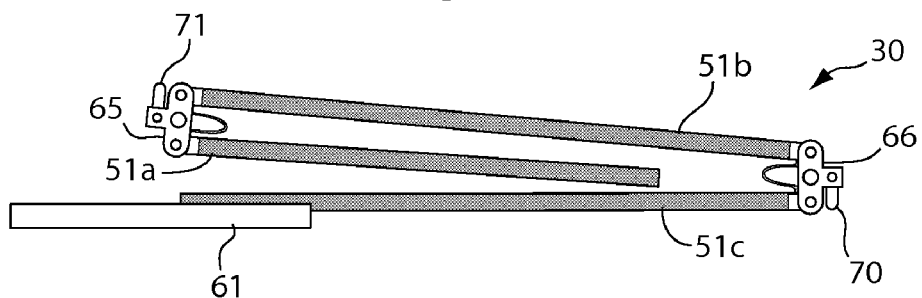
FIG. 3b is a side view of the changing station of FIG. 3a in a folded position.

FIG. 3b illustrates the changing station 30 in a folded position. The side rods 51, 52 are foldable at the hinges 65, 66. The section of frame 51a furthest from the stroller folds flat against the next section 51b at hinge 65. The combined structure is then folded at hinge 66 flat against the final section 51c. The legs 70, 71 also fold flat against respective parts of the frame. Of course, the hinges could be arranged to fold the frame and legs in a different manner.

Figure 2:
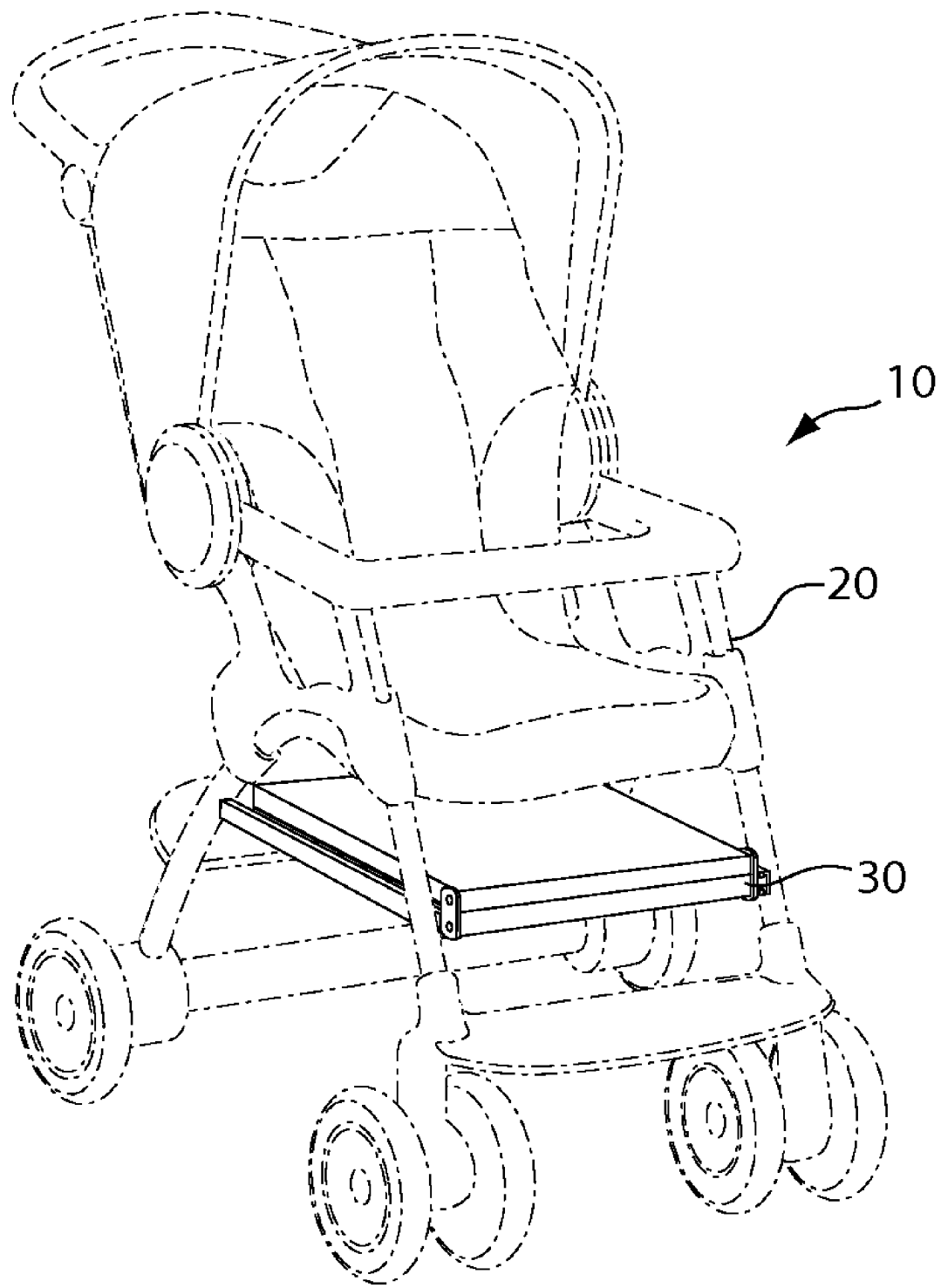
FIG. 2 is a perspective view of stroller with a changing station in a closed position according to an embodiment of the present invention.

When the changing station 30 is in the folded position it can be stored under the seat of the stroller 20. According to an embodiment of the present invention, the side rods 51c, 52c are attached to slidable ramps 60, 61. The ramps are connected to the legs of the stroller 20 under the seat. The side rods 51c, 52c slide within the ramps to move the entire changing station to a position under the stroller seat, as illustrated in FIG. 2. Locking mechanisms 62, 63 are positioned on the ramps 60, 61 to control motion of the side rods relative to the ramps. The locking mechanisms 62, 63 can be operated automatically or manually. They can lock the changing station into position either when extended, when stored, or both.

When the changing station 30 is required, it is slid out along the slidable ramps 60, 61 from underneath the stroller seat. Although the drawings illustrate the changing station 30 being positioned in front of the stroller 20, it could be arranged to slide out from the back or side of the stroller. When the changing station has slid to the end of the ramps 60, 61 it is locked in place by mechanisms 62, 63. It cannot be further removed from the stroller. The locking mechanism 62, 63 may include a manual release so that the entire changing station can be removed from the ramps and the stroller. Once the changing station is locked in position, it is unfolded at hinge 66. The leg 70 at that hinge may also be unfolded. The next section of the of the changing station is unfolded at hinge 65, along with leg 71 to form full length of the changing station. The changing station is ready to be used. If needed, an adjustable safety belt can be attached to the middle of the bed 40. The safety belt functions to secure the baby in place on the changing station to prevent rollover accidents.

To store the changing station 30, the legs 70, 71 are moved back into a folded position. The frame 50 is folded at the hinges 65, 66 into the folded position. The changing station 30 is then slid along ramps 60, 61 back underneath the stroller seat. If a locking mechanism is used, then it will need to be operated to allow the changing station to slide back under the seat.

The changing station of the present invention may be connected to the stroller in different manners. The slideable ramps are only one possible connection mechanism. The slide rods could be hinged to the legs of the stroller, without the use of the slideable ramps. The changing station, when folded, would then hang from and rest against the legs of the stroller below the seat. The hinges can be of a locking type so that the side rods are held horizontally, or an a predetermined angle, relative to the ground when the in use. When not being used, the folded changing station may form a foot rest for the stroller. Alternatively, the changing station could be detachable from the legs of the stroller for storage or transport in a pocket or other part of the stroller. Additional legs may be used on the changing station, such as at each corner, so that is could be used independently from the stroller.

The changing station of the present invention may also be used on an umbrella type stroller. With an umbrella stroller, the front legs (and rear legs) are folded towards each other when the stroller is closed. When used with an umbrella stroller, the end rods 53, 54 (and any cross rods 55, 56) must be foldable, hinged, or have a locking mechanism so that the side rods 51, 52 can move toward each other during folding of the stroller. The end rods 53, 54 would lock into position when in use to create tension on the bed to support the child. Alternatively, the end rods, 53, 54 and any cross rods 55, 56 can be removable to merely eliminated. The positioning of the side rods 51, 52 can provide sufficient tension on the bed 40 to support an infant during the diaper changing process.

Figure 4:
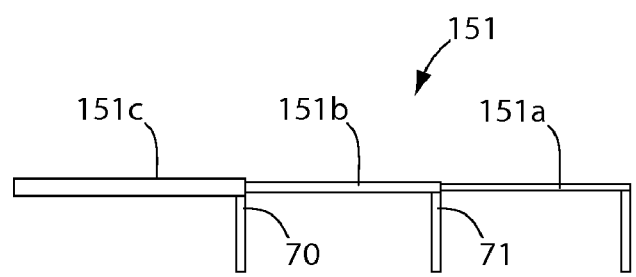
FIG. 4 is a side view of a changing station according to another embodiment of the present invention.

The frame of the changing station has been described as having a folding structure. Of course, other structures could be used to extend the bed of the changing station. FIG. 4 illustrates a side rod 151 formed of pieces which slide within each other. As with the previous embodiment, the side rod 151 is formed of three pieces 151a, 151b, 151c. However, rather than being hinged, the pieces telescope. Fur use, the pieces are extended by pulling out each of the segments until the bed is at full length. Legs 70, 71 may also be included on this embodiment. To close, the bed is pushed in until each of the segments is fully within the preceding segment.

Figure 5A:
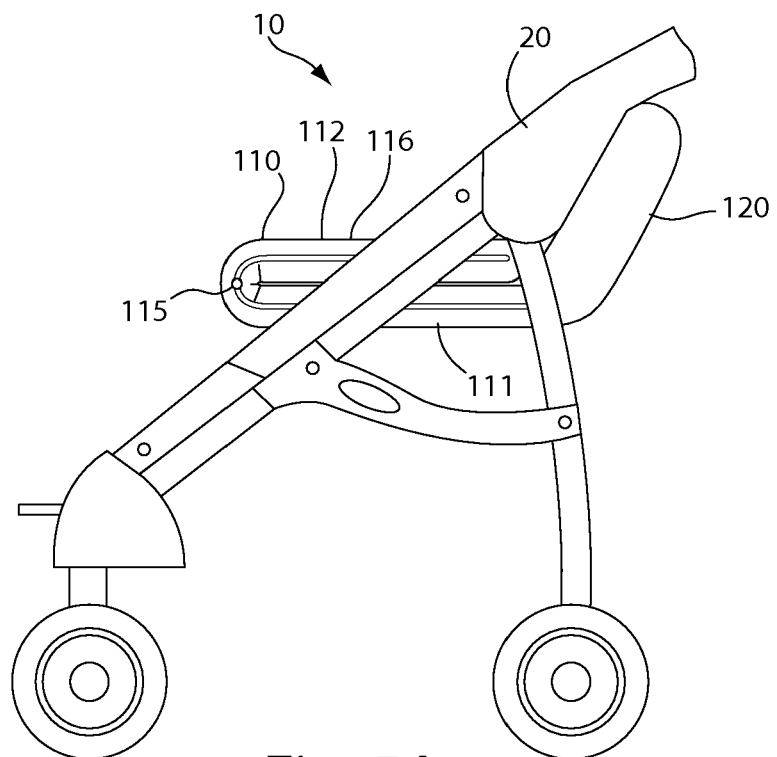
FIGS. 5a and 5b are side views of a stroller having a changing station according to a second embodiment of the present invention.
Figure 5B:
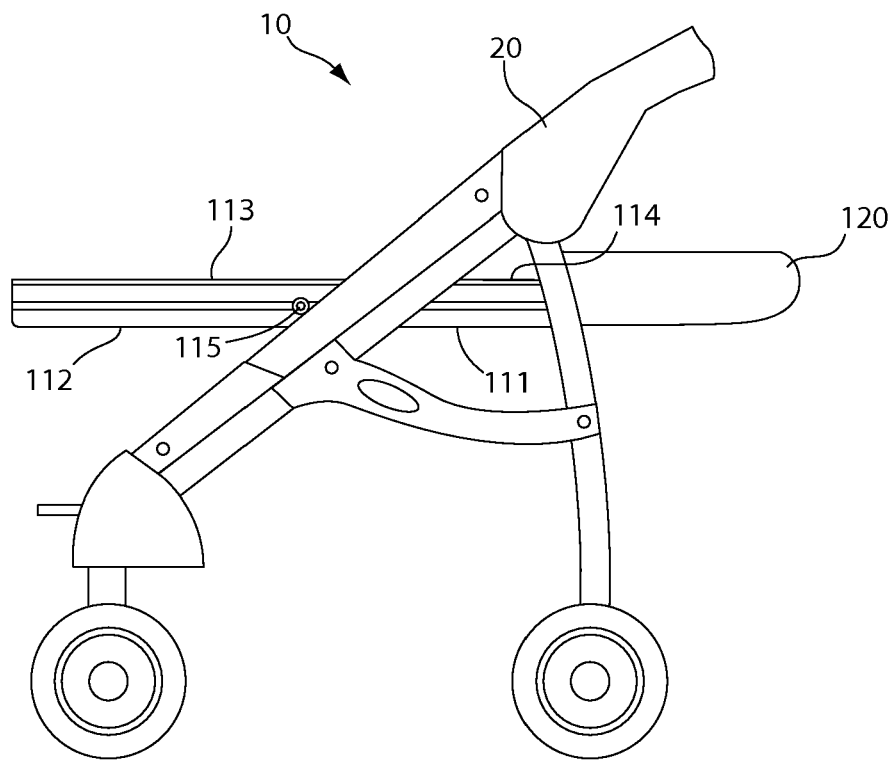

The prior embodiment of the invention includes a changing station positioned below the seat of the stroller which can be extended for use. Additional embodiments of the invention incorporate a changing station within the seat of the stroller. Portions of the stroller set are convertible to form the changing station. FIGS. 5a and 5b illustrate a second embodiment of the invention which incorporates a changing station and seat. As is known, the stroller 20 includes a seat 110 and a backrest 120. The backrest 120 is hinged to the seat 110, in a known manner so that it can be positioned flat or nearly flat, as illustrated in FIG. 5b. The seat 110 for the stroller in this embodiment of the invention is formed of two sections 111, 112. A lower section 111 is connected between the legs of the stroller 20 in any known manner. The lower section 111 is also connected to the backrest 120. An upper section 112 is connected, preferably along the front edge, to the lower section 111. A hinge 115 may be used along the front of the lower section 111, away from the backrest, to connect to the upper section 112. The hinge 115 may include one or more hinges at the sides of the seat or along the edge of the seat. The hinge 115 allows the upper section 112 to rotate about the hinge to an open position as illustrated in FIG. 5b. Alternatively, the upper section 112 and lower section 111 may be connected together and merely folded against each other. The upper section 112 is unfolded to open the changing station. An upper surface 114 of the lower section 111 and a lower surface 113 of the upper section 112 form the changing station when in the open position. These surfaces include a waterproof material which is easily cleaned of contamination or dirt acquired during the diaper changing process. An upper surface 116 of the upper section 112 forms the seat when the stroller is used. It is formed of a soft material as used in stroller seats.

The structure of the upper section 112 and lower section 111 can be of any known construction in order to provide support as a stroller seat and as a changing station. They may include lateral borders on each side. The lateral borders may be a continuous extension of the stroller frame or distinct rods. An interior border may also be used for additional support. The sections may be formed of a firm material, such as plastic, within the seat, to provide the necessary support. Some strollers include a foot board which extends from below the seat. The foot board may be raised and locked into a horizontal position to support the upper section 112 of the seat in the open position. This would eliminate the need for an additional frame or support within the upper section 112. Additionally, the seat 110 may first slide away from the backrest 120 before being unfolded. This allows the baby to be lifted slightly, maybe an inch or less, above the seat to allow the upper section 112 to be opened to the changing station.

When in the closed position, the upper section 112 can be secured into place with Velcro, buttons, snaps or other locking mechanisms to prevent shifting of the stroller seat and hazard to the baby. The waterproof surfaces 113, 114 are hidden within the stroller seat 110 when in the closed position. Thus, the appearance of an ordinary stroller is maintained.

During use of the changing station, the backrest 120 can be positioned horizontally to help support the child. Additionally, the backrest 120 of the stroller could be constructed in the same manner as the seat, with two hinged or connected sections which open to reveal a waterproof surface. This embodiment would increase the area of the changing station. Different structures could be used to connect various combinations of the seat and backrest when both are formed with multiple sections.

The standard seat belt from the stroller can be used to secure the child to prevent rolling out of the stroller. Also, the child may remain in the stroller during the conversion from the closed seat to the open changing station.

Figure 6:
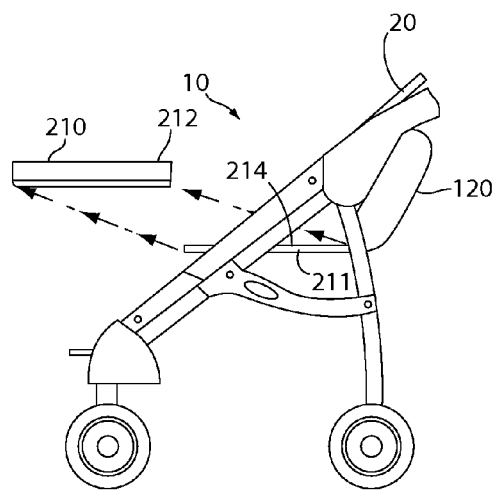
FIG. 6 is a side view of a stroller having a changing station according to a third embodiment of the present invention.

FIG. 6 illustrates a third embodiment of the changing station of the present invention. As in the second embodiment, the stroller includes a seat 210 having an upper section 212 and lower section 211. However, whereas the section in the second embodiment are connected, the sections in this embodiment are not connected together. The upper section 212 of the seat is removable. An upper surface 214 of the lower section 211 is of a waterproof material. When the upper section 212 of the seat 210 is removed, the lower section 211 forms the changing station. The upper section 212 may be connected to the lower section by Velcro, snaps, buttons or other locking mechanism to prevent movement of the seat when the stroller is being used.

Figure 7:
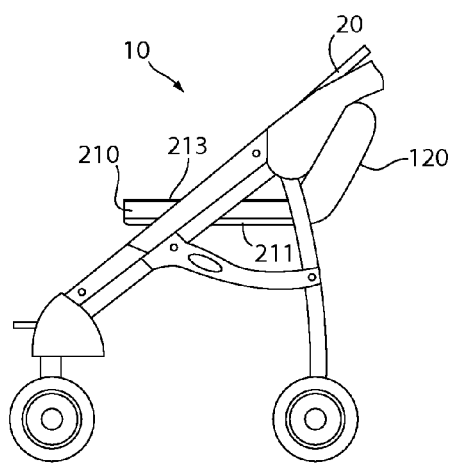
FIG. 7 is a side view of a stroller having a changing station according to a fourth embodiment of the present invention.

A fourth embodiment of the invention is illustrated in FIG. 7. This embodiment is similar to the third embodiment. The seat 210 has an upper section 212 and lower section 211. The upper section 212 has two surfaces. A bottom surface 213 is of a waterproof material. The other surface is of a material similar to the upholstery of the stroller. Once the upper section 212 is removed, it is turned over and placed on the lower section 211. The waterproof material on the bottom surface 213 of the upper section 212 forms the changing station at the seat of the stroller. The child is placed in a supine position with his or her pelvis on the waterproof surface 213 ready for a diaper change.

A variation of the third and fourth embodiments is to include a backrest having two sections. An upper section of the backrest as well as the upper section of the seat are removed. The lower sections may be used as the changing station, or the upper sections can be turned over to create the changing station. The advantage of this variation is that a larger waterproof surface area is available for changing the baby.

Figure 8:
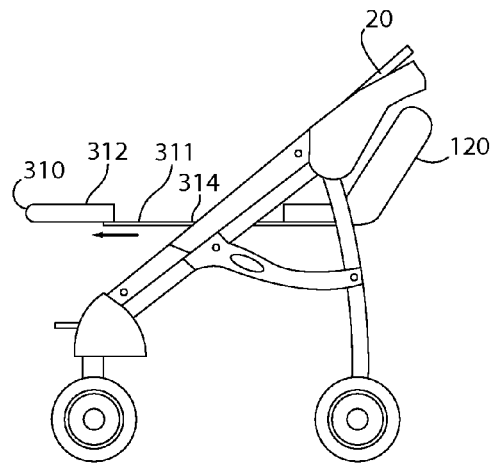
FIG. 8 is a side view of a stroller having a changing station according to a fifth embodiment of the present invention.

A fifth embodiment of the present invention is illustrated in FIG. 8. This embodiment is similar to the third embodiment in that the seat 310 of the stroller 20 is formed of an upper section 312 and lower section 311. An upper surface 314 of the lower section 311 includes a waterproof material forming a changing station. In this embodiment, the upper section 312 of the seat is not removable. Instead, it slides horizontally relative to the lower section 311. The sliding function may be achieved using glides, telescoping rods, or other known structures. The upper section 312 is slid forward to reveal the waterproof surface 314 of the lower section 311. After use of the changing station, the upper section 312 is slid back into place over the lower section 311. As with the prior embodiment, the backrest 120 could also be formed of two sections which are slid apart to reveal a larger waterproof area for the changing station.

Figure 9:
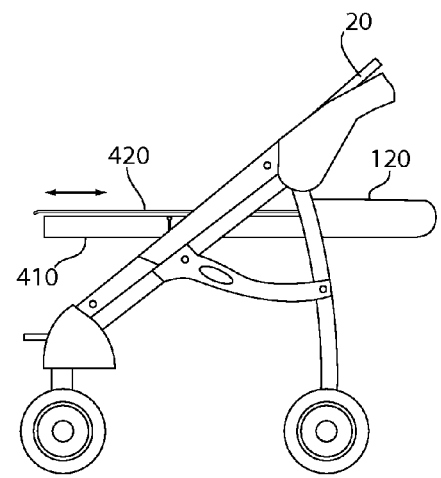
FIG. 9 is a side view of a stroller having a changing station according to a sixth embodiment of the present invention.

A sixth embodiment of the invention is illustrated in FIG. 9. In this embodiment, the changing station is formed as a pullout screen 420. The screen 420 is made of a waterproof material. It is placed at the junction between the seat 410 and the back rest 20. The pullout screen 420 can be built into or attached to the framework of the stroller. It can be part of the upholstery. It may be folded or operate on a roller. If on a roller, it could include springs to retract the screen. When using the changing station, the pullout screen 420 is extended from a storage compartment over the seat 410. The screen 420 can be locked into position for use. To store, the lock is released and the screen is returned to the storage compartment.

Having disclosed at least one embodiment of the present invention, various adaptations, modifications, additions, and improvements will be readily apparent to those of ordinary skill in the art. Such adaptations, modifications, additions and improvements are considered part of the invention which is only limited by the several claims attached hereto.

The invention claimed is:

1. A convertible stroller seat comprising:
   a first surface;
   a second surface including a sheet of a waterproof material extendible over an upper surface of the stroller seat; and
   means for switching between the first surface and the second surface as an uppermost surface of the stroller seat, wherein the means for switching includes a roller positioned within the stroller seat, the sheet of waterproof material being wrappable around the roller.

2. The convertible stroller seat according to claim 1, wherein the roller includes a spring for rotating the roller to wrap the sheet of waterproof material around the roller.

3. The convertible stroller seat according to claim 1, wherein the first surface is of an upholstery material.

4. A convertible stroller seat comprising:
   a seat having an upper portion and a lower portion, the upper portion being movable with respect to the lower portion so that in one position the upper portion rests on and is generally parallel to the lower portion, the upper portion having first and second sides;
   a first surface on the first side of the upper portion;
   a second surface on the second side of the upper portion; and
   means for switching between the first surface and the second surface as an uppermost surface of the stroller seat.

5. The convertible stroller seat according to claim 4, wherein the upper portion and lower portion are connected along a front edge of the seat such that the upper portion is rotatable between a first position with the first surface being uppermost and a second position with the second surface being uppermost.

6. The convertible stroller according to claim 5, wherein the upper portion and the lower portion are connected with a hinge.

7. The convertible stroller seat according to claim 5, wherein the second surface also includes a side of a lower portion of the seat.

8. The convertible stroller seat according to claim 4, wherein:
the first surface is of an upholstery material and
the second surface is of a waterproof material.

9. A convertible stroller seat comprising:
a seat having an upper portion and a lower portion, the upper portion being movable with respect to the lower portion so that in one position the upper portion rests on and is generally parallel to the lower portion;
a first surface on one side of the upper portion;
a second surface on one side of the lower portion; and
means for switching between the first surface and the second surface as an uppermost surface of the stroller seat.

10. The convertible stroller seat according to claim 9, wherein the upper portion is removable from the lower portion to expose the second surface on lower portion as the uppermost surface of the stroller seat.

11. The convertible stroller seat according to claim 9, wherein the upper portion is slidable with respect to the lower portion to expose the second surface on the lower portion as the uppermost surface of the stroller seat.

12. The convertible stroller seat according to claim 9, wherein the upper portion and lower portion are connected along a front edge of the seat such that the upper portion is rotatable between a first position with the first surface being uppermost and a second position with the second surface being uppermost.

13. The convertible stroller according to claim 12, wherein the upper portion and the lower portion are connected with a hinge.

14. The convertible stroller seat according to claim 12, wherein the second surface also includes a side of a lower portion of the seat.

15. The convertible stroller seat according to claim 9, wherein:
the first surface is of an upholstery material and
the second surface is of a waterproof material.

* * * * *